July 19, 1955 W. A. BEDFORD, JR 2,713,284
SPACED PANEL FASTENING DEVICE
Filed May 19, 1950
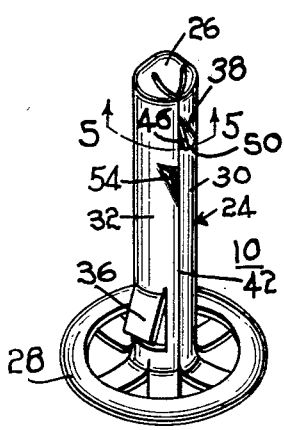
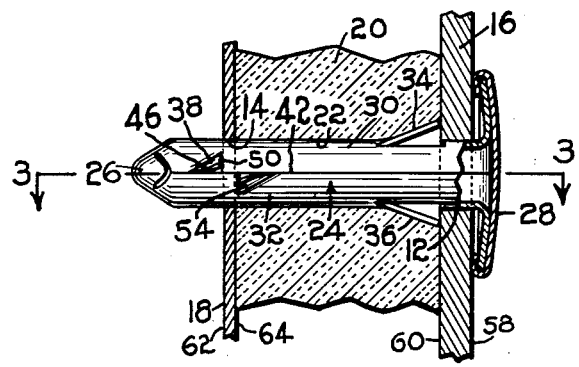
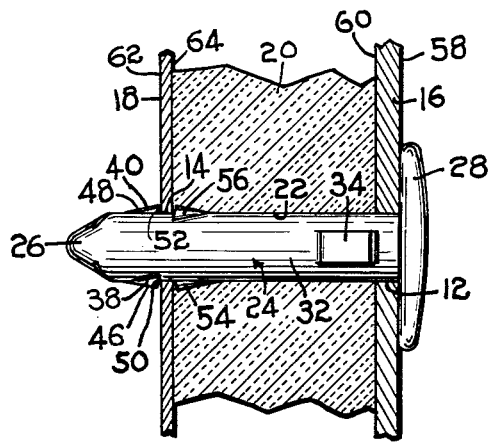
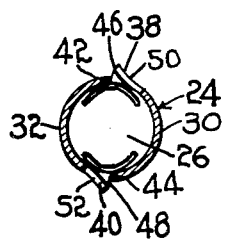
INVENTOR:
WILLIAM A. BEDFORD JR.,
By Robert E Ross
AGENT.

2,713,284

SPACED PANEL FASTENING DEVICE

William A. Bedford, Jr., North Scituate, Mass., assignor, by mesne assignments, to United-Carr Fastener Corporation, Boston, Mass., a corporation of Delaware Application May 19, 1950, Serial No. 163,009

2 Claims. (Cl. 85—5)

This invention relates generally to fastening devices, and has particular reference to a fastener for assembly in aligned openings in a pair of spaced panels to retain the panels in predetermined spaced relation.

The object of the invention is to provide a fastening member having a shank with a pair of spaced panel-engaging members disposed thereon for engagement through openings in spaced panels.

A further object of the invention is to provide a fastening member having a tubular shank which is provided with means thereon for engaging spaced panels to retain the panels in predetermined spaced relation.

A still further object of the invention is to provide a fastener in which a tubular shank which is closed at one end and has an enlarged head at the other end is provided with means adjacent the head for engaging a panel section therebetween, and means near the closed end for engaging a panel to maintain the panels in spaced relation to one another.

In the drawings:

Fig. 1 is a perspective view of a fastening device embodying the features of the invention;

Fig. 2 is a view in elevation partly in section of the fastening devices of Fig. 1 in assembly with a pair of panel members;

Fig. 3 is a view in section taken on the line 3—3 of Fig. 2;

Fig. 4 is a plan view of the fastener member of Fig. 1; and

Fig. 5 is a view in section taken on the line 5—5 of Fig. 1.

Referring to the drawing, there is illustrated a fastener 10, which is adapted for assembly into aligned openings 12 and 14 in a pair of spaced panels 16 and 18, to retain the panels in spaced relation.

The fastener is particularly adapted for use in the assembly of panels of various materials to form the dash panel or fire-wall of an automobile, in which case the panel 16 will be cardboard or similar material, and the panel 18 will be sheet metal. A layer 20 of fiber glass or similar material is interposed between the panels for insulating purposes, and the layer 20 is provided with an opening 22 which is aligned with the openings 12 and 14.

The fastener 10 comprises generally a tubular shank 24, which has a closed end 26 and an enlarged head or cap member 28 disposed on the other end. The shank 24 is preferably formed of a single piece of sheet metal having a pair of trough-shaped portions 30 and 32 which, when folded together, form the tubular shank 24. To provide means for engagement in the opening 12 in the panel 16 a pair of resilient locking tabs 34 and 36 are provided near the head 28. The tabs are preferably formed from the metal of the shank, and are inclined outwardly therefrom toward the head. The distance from the ends of the tabs 34 and 36 to the head is approximately equal to the thickness of the panel 16 for a purpose to be hereinafter described.

To provide means for engagement in the opening 14 of the panel 18, snap fastener means is provided on the shank 24 near the closed end 26, and said snap fastener means comprises a pair of inclined triangules ears 38 and 40, which are preferably formed in the metal of the shank adjacent longitudinal seams 42 and 44. The ears 38 and 40 have edges 46 and 48 forming the hypotenuse of the triangular ears which are inclined outwardly from the shank and away from the closed end 26, and terminate in abrupt shoulder portions 50 and 52 forming the base of the triangular ears. Stop means is provided on the shank adjacent the ears 38 and 40, and said means extends outwardly therefrom to engage a surface of the panel 18 when the fastener is inserted into the opening 14, said stop means being formed by ears 54 and 56 similar in shape to the ears 38 and 40, with the only difference being that the ears of the stop means are inclined in the opposite direction. However, the shape of the stop means is not critical so long as it is able to bear against a surface of a panel 14 to limit the distance that the closed end is able to enter the opening 12. The distance between the stop means and the shoulder portions 50 and 52 of the snap fastener means is approximately equal to the thickness of the panel 18 for a purpose to be hereinafter described.

To assemble the fastener with the panels, the closed end 26 is inserted into the opening 12 in the panel 16, and is passed therethrough until the head 28 bears against the outer surface 58 of the panel. During this assembly operation the tabs 34 and 36 spring inwardly to pass through the opening and then snap outwardly behind the panel to engage the rear surface 60 thereby locking the fastener itno place relative to the panel 14.

Since the snap fastener ears 38 and 40 and the stop means near the closed end are designed to be relatively rigid for engagement with the sheet metal panel 18 and extend only a slight distance outwardly from the shank, the ears and stop means are capable of being easily forced through the opening 12 in the cardboard panel.

The layer 20 of fiber glass is then assembled against the panel 16 so that the closed end 26 protrudes therefrom. The end 26 is then inserted into the opening 14 in the sheet metal panel 18 so that the ears 38 and 40 flex inwardly to pass through the opening and then snap outwardly to engage the outer surface 62 of the panel 18. The ears 54 and 56 engage the inner surface 64 of the sheet metal panel, thereby retaining the panel in a predetermined fixed relation to the cardboard panel 16.

It has been found that in automotive dash panel or fire-wall applications, there is a tendency for the panels to creep together during use, due to vibration and other causes with the result that the intervening layer 20 of the fiber glass becomes compressed and thereby loses its effectiveness as a heat and sound insulator. By providing positive locking means for spacing the panels, the fiber glass is able to retain its original relatively loose condition which is essential for the best insulating effectiveness.

Although in the illustrated embodiment, the fastener is formed of a tubular shank with a closed end, this construction is not essential, since in some cases the shank may be formed of a pair of separate arms.

Since certain other obvious modifications may be made in the device without departing from the scope of the invention, it is intended that all matter contained herein be interpreted in an illustrative and not in a limiting sense.

I claim:

1. A sheet metal fastening device for assembly in aligned openings of spaced panels comprising: a tubular shank formed of a pair of opposed transversely concave elongated sheet metal sections joined at their entering ends by an imperforate nose, integral leg members extending radially outwardly of said shank at the end thereof opposite the nose, an enlarged head covering the end of said shank opposite the nose and including a peripheral flange extending around the outer ends of said leg members and providing a continuous annular planar surface for sealing engagement with a panel surface, the marginal side edges of said elongated sections being in edge-to-edge abutting substantially waterproof engagement throughout substantially their lengths to provide a closed cylindrical shank having a pointed nose end and a shank wall of a single thickness of sheet metal, outwardly bent generally triangular support-engaging tabs on said shank adjacent the nose, adjacent inclined edges of said tabs comprising the marginal edges of axially spaced slits extending substantially normal to the adjacent marginal edge portions of said elongated shank sections, and the other inclined edges of said tabs being parts of the marginal edge portions of said elongated shank sections and extending in opposite directions from the apices of said tabs, said tabs being spaced longitudinally of said shank whereby one of said tabs 15 adapted for snap fastener engagement with an outer surface of one of a pair of spaced supporting panels through which said nose is passed to secure said fastening device in such supported panels when the peripheral flange of the head is in engagement with an opposite outer surface of the other of said pair, and a second one of said tabs is adapted for engagement with the inner surface of said one supporting panel so as to secure the tubular shank of the fastening device in fixed relation to such panel.

2. A sheet metal fastening device for assembly in aligned openings of spaced panels in accordance with claim 1 wherein a tongue is cut from the material of the tubular shank with the free end of the tongue disposed adjacent the head, the tongue being inclined outwardly from the shank to provide means for snap fastener engagement with an inner face of the supported panel to be engaged by the head of the fastening device to secure the tubular shank of the fastening device in fixed relation thereto.

References Cited in the file of this patent
UNITED STATES PATENTS

| Number | Name | Date |
| --- | --- | --- |
| 1,737,375 | King | Nov. 26, 1929 |
| 1,848,442 | Tideman | Mar. 8, 1932 |
| 2,110,959 | Lombard | Mar. 15, 1938 |
| 2,229,996 | Churchill | Jan. 28, 1941 |
| 2,244,975 | Tinnerman | June 10, 1941 |
| 2,267,873 | Place | Dec. 30, 1941 |
| 2,319,058 | Hansman | May 11, 1943 |
| 2,391,298 | Davis | Dec. 18, 1945 |
| 2,511,512 | Poupitch | June 13, 1950 |
| 2,560,530 | Burdick | July 10, 1951 |